United States Patent [19]
Smith et al.

[11] Patent Number: 5,984,623
[45] Date of Patent: Nov. 16, 1999

[54] CARRIER FEED VACCUM GRIPPER

[75] Inventors: Scott R. Smith, West Bend; Scott K. Haddix, Waukesha; Robert S. Grams, Waukesha; Carl F. Holter, Waukesha, all of Wis.

[73] Assignee: ABB Flexible Automation, Inc., New Berlin, Wis.

[21] Appl. No.: 09/052,239

[22] Filed: Mar. 31, 1998

[51] Int. Cl.⁶ .................................................. B65G 59/04
[52] U.S. Cl. ......................... 414/797; 414/416; 414/737; 414/796.6; 414/929; 294/65; 294/86.4; 294/104; 901/40
[58] Field of Search ........................... 414/729, 736–739, 414/741, 416, 796.9, 797, 796.6, 929, 752; 294/65, 104, 86.4; 901/40

[56] References Cited

U.S. PATENT DOCUMENTS

| | | | |
|---|---|---|---|
| 4,645,411 | 2/1987 | Madwed ............................... | 414/736 X |
| 5,199,845 | 4/1993 | Hirashima et al. ............... | 414/769.9 X |
| 5,365,977 | 11/1994 | Goad et al. ......................... | 414/741 X |
| 5,564,893 | 10/1996 | Tacchi et al. ........................ | 414/796.9 |
| 5,727,832 | 3/1998 | Holter ..................................... | 294/64.1 |

*Primary Examiner*—Donald W. Underwood
*Attorney, Agent, or Firm*—Nicholas A. Kees; Godfrey & Kahn, S.C.

[57] ABSTRACT

An end effector for use with a robot and capable of removing cases from a stack of cases and emptying the selected case of substantially flat, folded articles. The end effector includes a main body designed to be coupled to the robot. A case gripper is mounted on the bottom of the main body. A flattened articles gripper is also coupled to the main body and includes a vacuum chamber with two blades. A dunnage gripper is mounted on one of the sides of the main body. In use, the case gripper picks a full case from a pallet of cases and moves that case to an unloading station. There, the end effector is rotated so that the blades of the flattened articles gripper can be inserted into the case. With the blades inserted, vacuum is supplied to the flattened articles gripper to hold the articles against the gripper. Then, the end effector with the articles is moved to a regripping station where the articles are temporarily placed and regripped. So grasped, the articles are moved to a second station where the flattened articles are fed into an automated processing line. This process continues until an entire pallet of cases has been emptied. The dunnage gripper is used to remove sheets of material placed between each level of cases in the stack of cases and to remove empty cases from the unloading station.

19 Claims, 14 Drawing Sheets

FIG_3

FIG_6

FIG_7

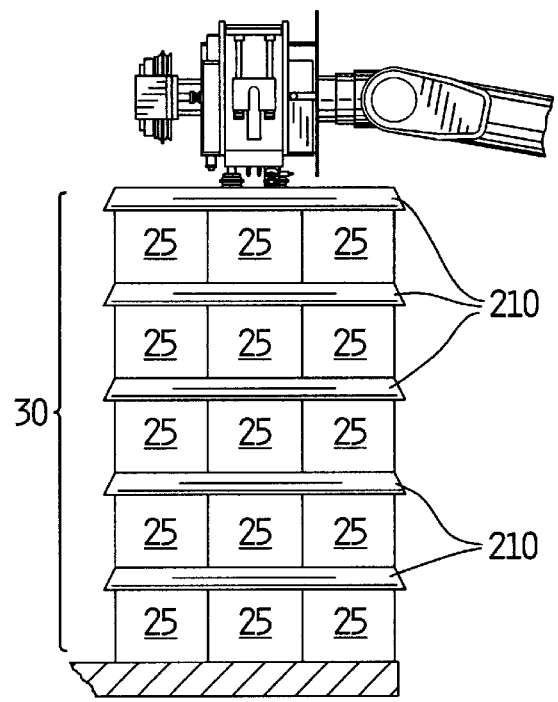
FIG. 9
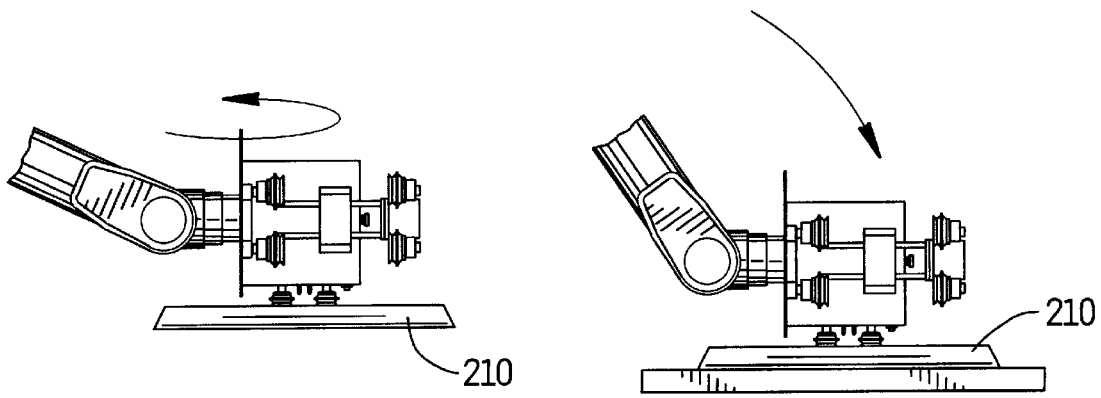
FIG. 9A
FIG. 9B

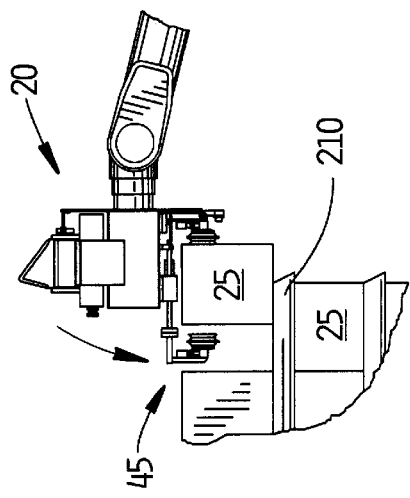
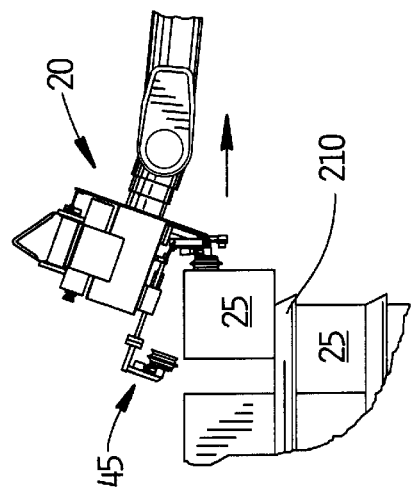
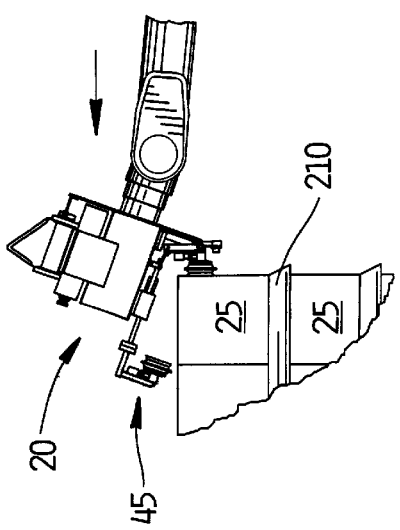
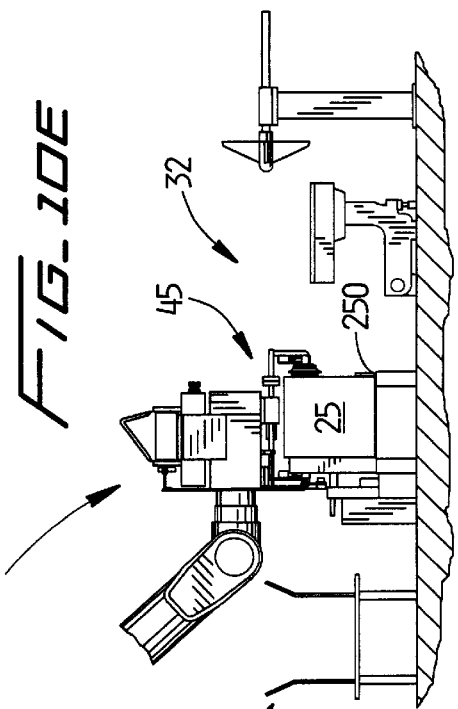
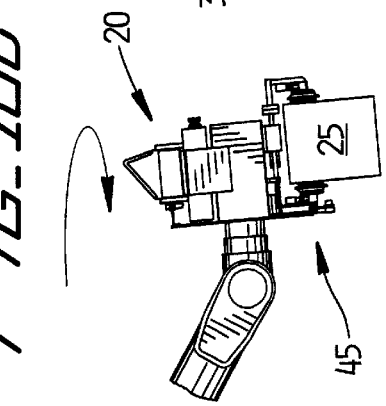
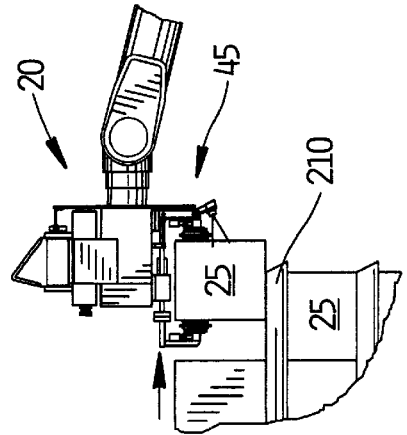

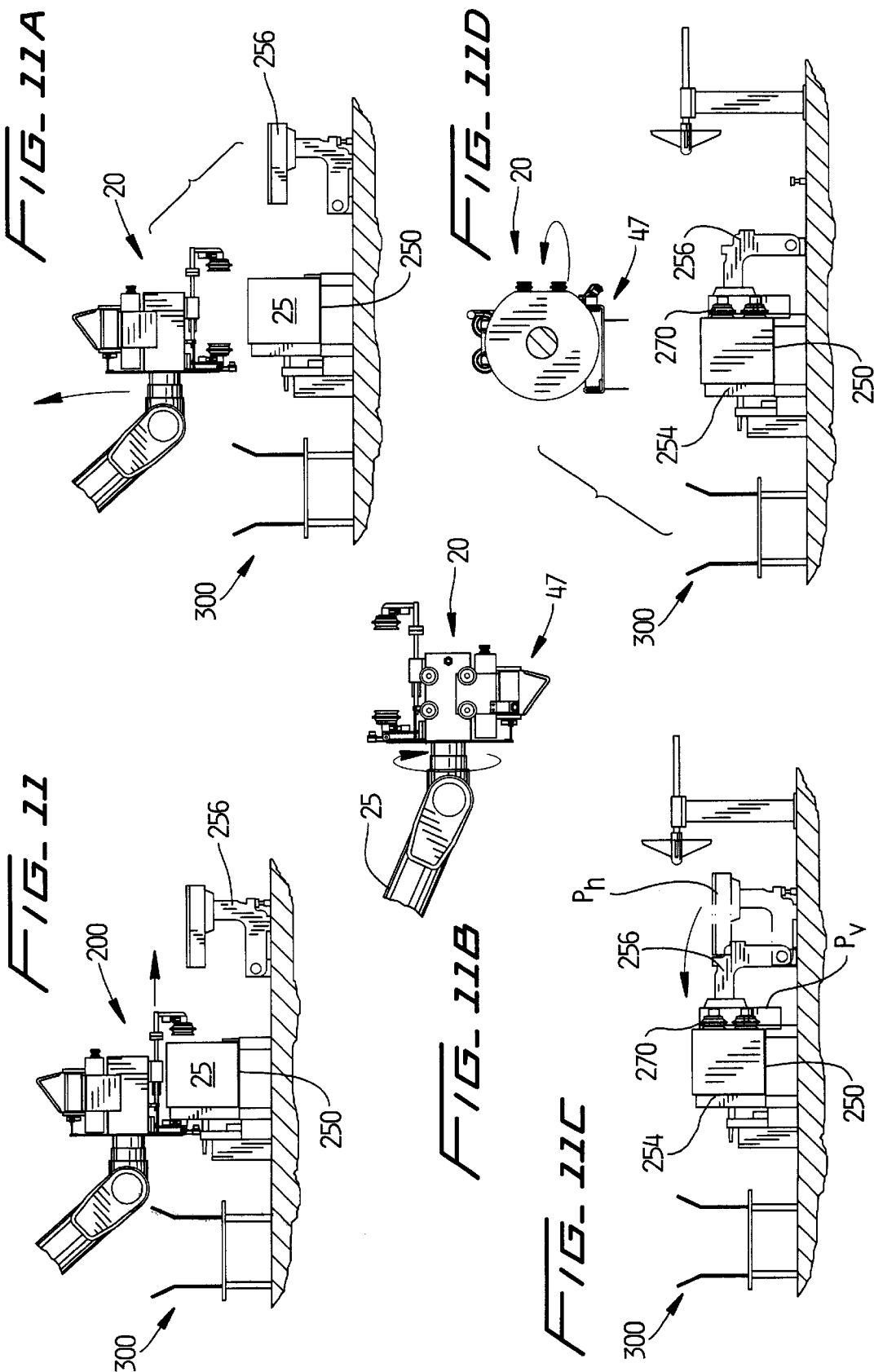

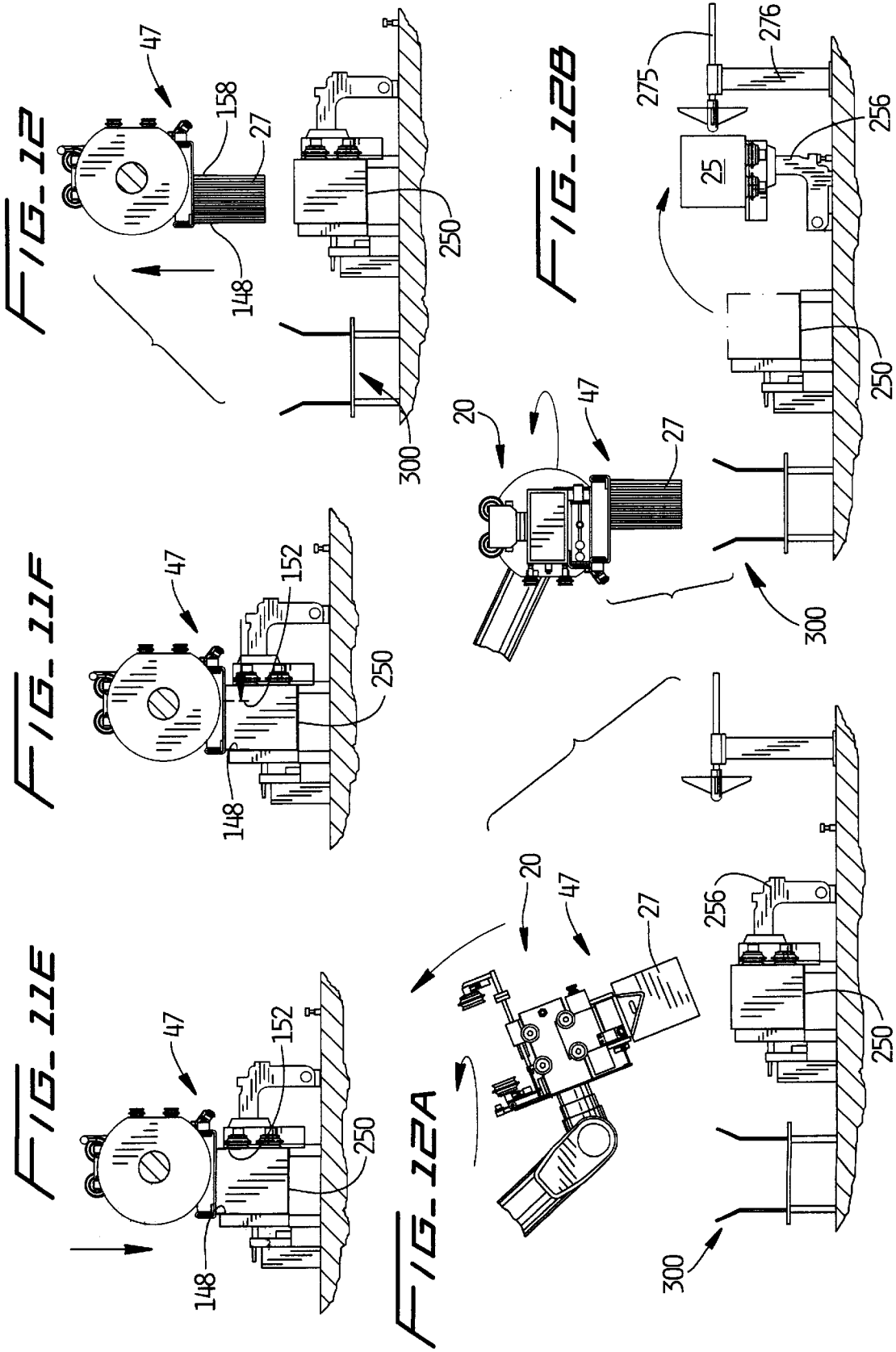

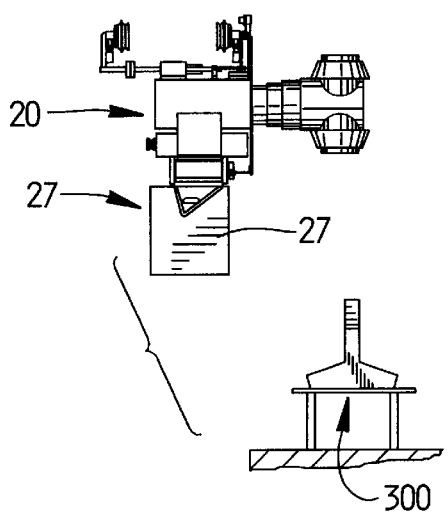
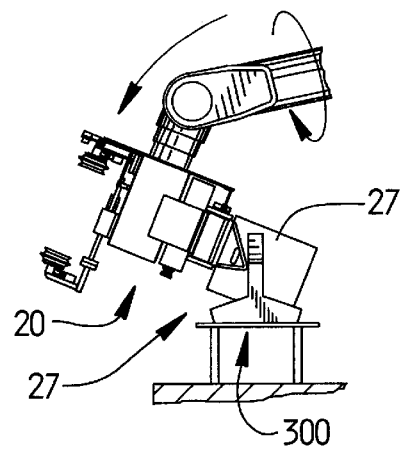
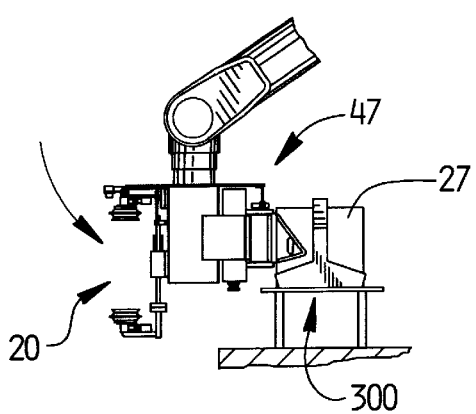
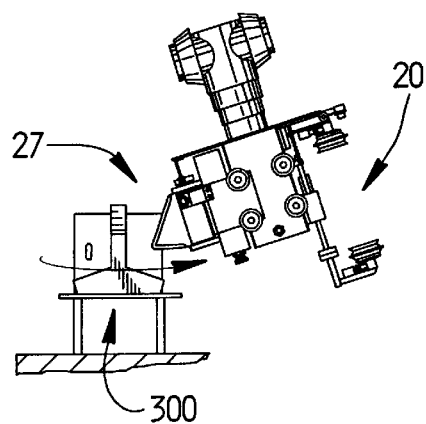
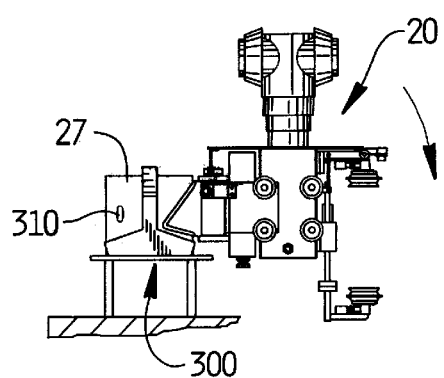
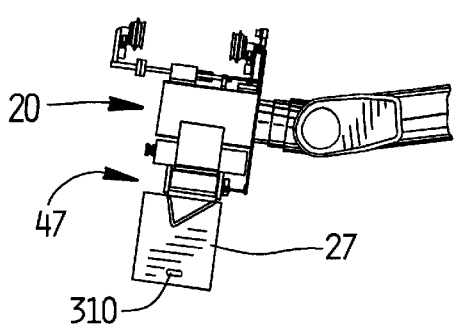

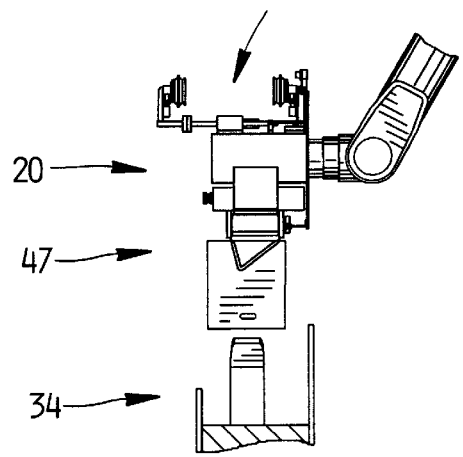
FIG_13A
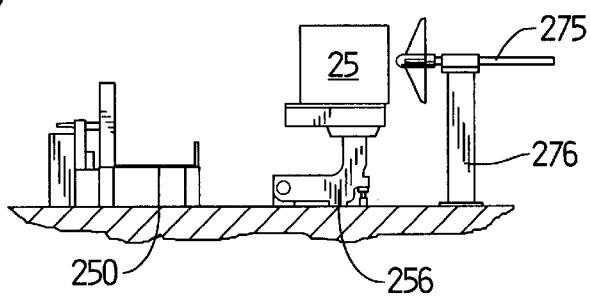
FIG_14
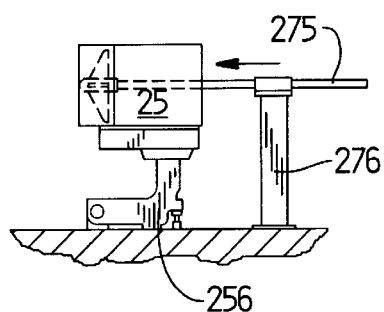
FIG_14A
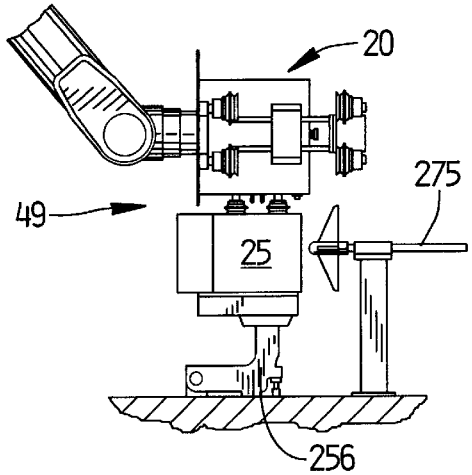
FIG_14B
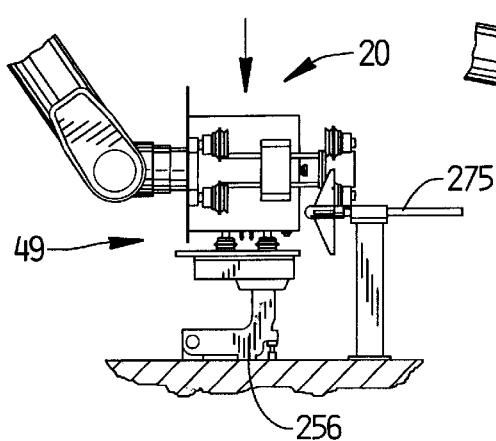
FIG_14C
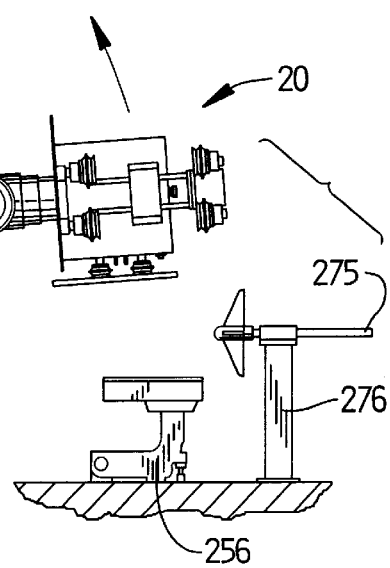
FIG_14D

CARRIER FEED VACCUM GRIPPER

FIELD OF THE INVENTION

The present invention relates to devices for transferring generally flattened articles from a shipping container to a desired location. More particularly, the present invention relates to a robot end effector capable of 1) manipulating shipping containers which hold generally flattened articles and 2) removing the articles from the containers so that the articles may be delivered to a desired location.

BACKGROUND OF THE INVENTION

In bottling, canning, and other industries large amounts of packaging material such as folded, flat, paperboard containers must be handled. Typically, packaging material arrives in shipping containers such as corrugated cardboard boxes. The boxes are shipped on pallets and it is necessary to remove the packaging material from the corrugated boxes on the pallets to automated processing lines where, for example, folded paperboard containers are opened, filled with beverage cans, and then sealed.

In most instances, the task of removing the packaging material is carried out manually. Manual labor is used to perform this task because humans (as opposed to most existing machines) are able to handle packaging material without damaging it. This is important because while packaging material serves a functional purpose as a product container, it must also be aesthetically attractive and visually appealing. Often containers made from packaging material have elaborate printing on their surfaces and filled containers are stacked to create aisle displays in supermarkets and other retail stores. Further, the paperboard containers may also be used as product dispensers, such as, for example, facial tissue boxes. Thus, it is of great importance that paperboard containers or similar items be handled without damaging them or the printing or other indicia on their surfaces.

While having certain advantages, manually handling shipping containers and unloading paperboard containers is relatively strenuous and tedious. It can literally be "back-breaking work," as the continued lifting and moving of packaging material can cause back injuries. Further, many workers must be employed to remove the folded paperboard containers from their boxes and feed the folded containers into processing lines.

In an effort to reduce salary and injury costs, there have been some attempts to automate this process by using robots. As in known in the art, industrial robots may be fitted with various claws and other grasping devices to pick up and move articles of interest. In some known systems, a first robot with a grasping device is used to remove a single shipping container containing folded paperboard containers from its pallet to an unloading station. At the unloading station, a second robot having a mechanical gripper is used to remove the folded paperboard containers from the shipping container. While functional, most known systems are not satisfactory because two robots are needed. This requirement increases the cost of an automated system. Further, mechanically grasping and contacting of paperboard containers causes them to be scratched, marked, or otherwise marred or damaged while they are handled.

In later systems, such as the one shown in U.S. application Ser. No. 08/571,215 (now U.S. Pat. No. 5,727,832), only a single robot is used. The robot is fitted with an end-effector which has two grippers, one for handling boxes filled with folded paperboard containers and another for handling the paperboard containers themselves. However, this end-effector is relatively large and the gripper used to handle full boxes cannot easily remove boxes from a tightly-packed pallet. Further, the end-effector has no capability to remove dunnage sheets placed between layers of boxes in a pallet, necessitating manual removal of the sheets.

Accordingly, there is a need for a device which may be used to handle stacks of boxes or other containers containing relatively flat articles. More specifically, there is a need for a device which can remove boxes or other shipping containers from a tightly packed pallet to an unloading station or location, remove the flattened articles from the shipping container without damaging them, handle any dunnage which may be placed in the pallet, and be relatively small and lightweight so that is can operate in a limited amount of space and at relatively high speeds.

OBJECTS AND SUMMARY OF THE INVENTION

Therefore, it is an object of the present invention to provide a device which may be used to handle stacks of shipping containers, cases, or boxes filled with relatively flat articles.

A further object of the present invention is to provide an end effector for use with a robot where the end effector is capable of picking a full case of relatively flat articles from a tightly-packed pallet of cases and moving the selected case to an unloading or emptying station.

A further object of the present invention is to provide an end effector for use with a robot where the end effector is capable of lifting the entire contents of flattened articles out of a case at the emptying station and moving the stack of articles to a processing line.

A further object of the present invention is to provide a device capable of handling flat articles without damaging them.

A further object of the present invention is to provide a device capable of handling dunnage sheets and removing them from cases stacked on a pallet.

These and other objects and advantages are achieved in an end effector including a main body designed to be coupled to an industrial robot. A case gripper is mounted on the bottom of the main body. The case gripper includes a mount, a first suction assembly pivotably coupled to the mount, a linear slide or thruster, and a second suction assembly coupled to the linear slide. The first suction assembly of the case gripper includes two arms pivotably coupled to the mount. Each arm has first and second ends and a biasing mechanism coupled to its first end and a suction device coupled to its second end. Each arm is biased so that it remains in a substantially vertical position, even when the end effector is tilted or moved to an inclined position. One or both of the arms may have a proximity sensor mounted on their second ends.

The end effector also includes a vacuum source mounted on the top of the main body and two other grippers: a flattened articles gripper and a dunnage gripper. The flattened articles gripper is mounted to the top of the main body and coupled in fluid communication to the vacuum source. The flattened articles gripper includes a vacuum chamber with two grooved blades, one of which is adjustable by means of a linear thruster. The dunnage gripper is mounted on one side of the main body.

In operation, the case gripper picks a full case from a pallet of cases and moves the selected case to an unloading station. There, the case is released and the end effector is rotated so that the blades of the flattened articles gripper can be inserted into the case. With the blades inserted into the case, vacuum is supplied to the flattened articles gripper to hold the articles against the gripper. The end effector holding the articles may then be moved to a desired location, such as an automated processing line, where the articles are released. (Alternatively, the end effector holding the flattened articles may be moved to a re-grip station where the articles are placed, released, and then re-gripped on an opposite side. Grasped again, the flattened articles are moved to a second station where they are fed into an automated processing line.) This process continues until an entire level of containers has been removed from the pallet of cases. The dunnage gripper is used to remove sheets of material placed between each level of cases in the stack of cases and to remove empty cases from the unloading station.

Further objects and advantages of the present invention will become more apparent from the following detailed description of the preferred embodiment taken in combination with the accompanying drawings.

BRIEF DESCRIPTION OF THE DRAWINGS

FIG. 9 is a side view of the end effector of the present invention picking up a dunnage sheet on a stack of cases.

FIG. 9A is a side view of the end effector of the present invention moving a dunnage sheet to a piling location.

FIG. 9B is a side view of the end effector of the present invention placing a dunnage sheet at a piling location.

FIG. 10 is a side view of the end effector of the present invention initially gripping a box or case from a stack of cases.

FIG. 10A is a side view of the end effector of the present invention pulling a case to a position where the side opposite the gripped side is exposed.

FIG. 10B is a side view of the end effector of the present invention tilting to a position to fully grip the selected case.

FIG. 10C is a side view of the end effector of the present invention fully gripping the selected case.

FIG. 10D is a side view of the end effector of the present invention rotated and moving toward an unloading station.

FIG. 10E is a side view of the end effector of the present invention placing a selected case at the unloading station.

FIG. 11 is a side view of the end effector of the present invention releasing the selected case at the unloading station.

FIG. 11A is a side view of the end effector of the present invention moving away from the unloading station.

FIG. 11B is a side view of the end effector of the present invention rotating to move the flattened articles gripper to an orientation to grasp articles in the selected case.

FIG. 11C is a side view of the unloading station of the present invention showing the vacuum table of the present invention grasping the sides of the selected case.

FIG. 11D is an end view of the end effector of the present invention rotated and lowered into a position to grasp articles out of the selected case.

FIG. 11E is an end view of the end effector of the present invention inserted into the selected case.

FIG. 11F is an end view of the end effector of the present invention gripping the articles in the selected case.

FIG. 12 is an end view of the end effector of the present invention lifting the gripped articles.

FIG. 12A is a side view of the end effector of the present invention lifting the gripped articles.

FIG. 12B is a side view of the end effector of the present invention moved to a position over a holding table.

FIG. 12C is a side view of the end effector of the present invention positioned over the holding table.

FIG. 12D is a side view of the end effector placing the articles from the case in the holding table.

FIG. 12E is a side view of the end effector of the present invention releasing articles onto the holding table.

FIG. 12F is a side view of the end effector of the present invention moved to a position to regrip the articles from the case.

FIG. 12G is a side view of the end effector of the present invention regripping the articles from the case.

FIG. 13 is a side view of the end effector of the present invention lifting the regripped articles.

FIG. 13A is a side view of the end effector of the present invention placing the articles from the case in a carrier feed mechanism.

FIG. 14 is a side view of the unloading station of the present invention holding the empty case.

FIG. 14A is a side view of the ram of the unloading station bursting the bottom of the empty case.

FIG. 14B is a side view of the dunnage gripper gripping the burst case.

FIG. 14C is a side view of the end effector of the present invention flattening the burst case.

FIG. 14D is a side view of the dunnage gripper removing the flattened case from the unloading station.

DETAILED DESCRIPTION

Figure 1:
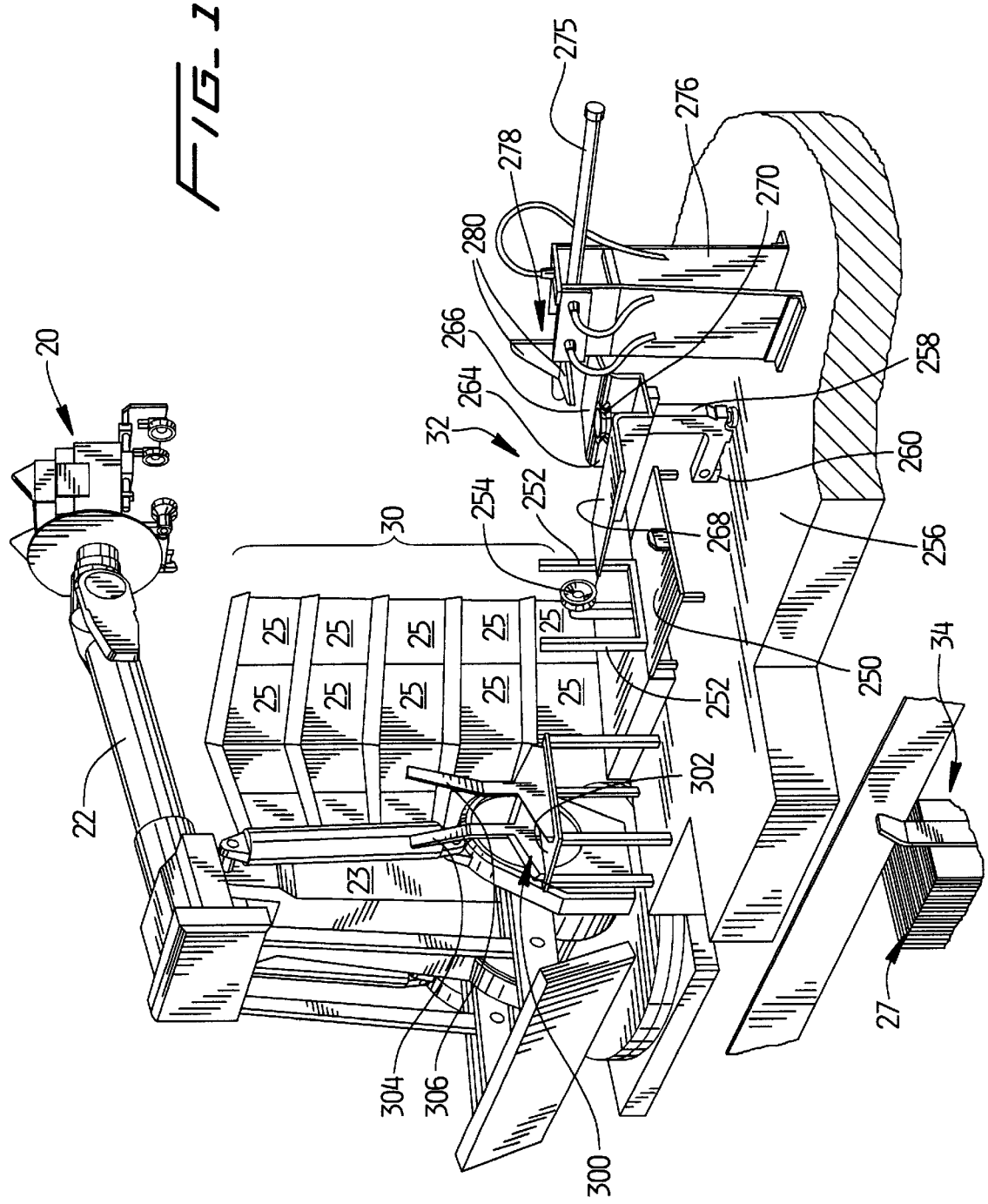
FIG. 1 is a perspective, environmental view of the end effector of the present invention shown mounted on an industrial robot.

Referring more particularly to the drawings, an end effector 20 is shown in FIG. 1. The end effector 20 is mounted on the end of the arm 22 of an industrial robot 23 of conventional design. The present invention is particularly suited to remove cases 25 filled with packaging material 27 from a palletized stack 30 of cases to an unloading station 32 where the packaging material 27 is removed from its case. The packaging material 27 is then moved using the end effector 20 from the unloading station 32 to a feeding mechanism 34 of an automated processing line (not shown) in which the packaging material is filled with product, such as beverage containers.

Figure 2:
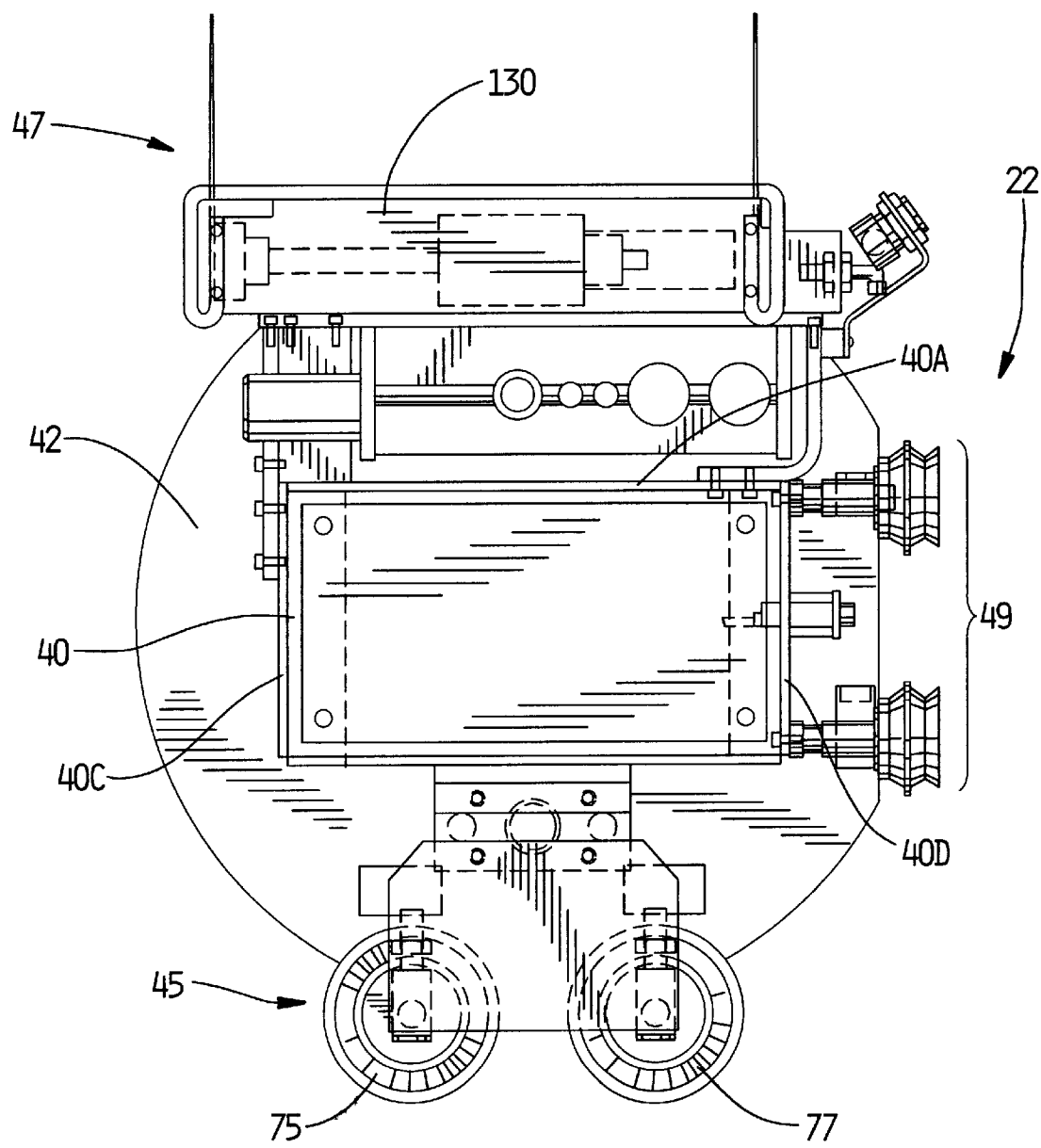
FIG. 2 is a perspective, side view of the end effector constructed according to one embodiment of the present invention.
Figure 3:
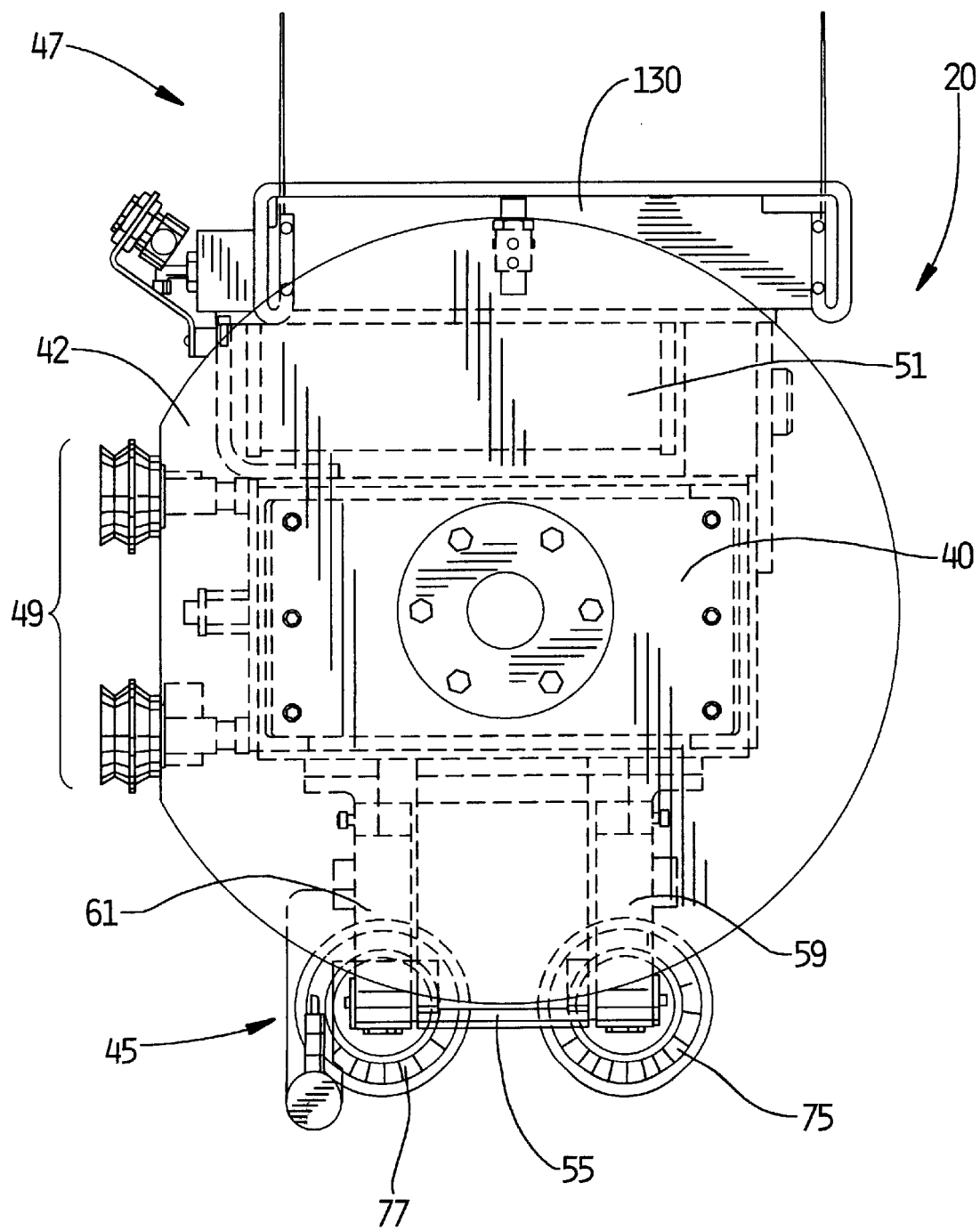
FIG. 3 is an end view of the end effector of the present invention.

As shown in FIG. 2, the end effector 20 has a main body 40 coupled to a mounting and protective plate 42 and these two components are coupled to the robot arm 22 in a conventional manner. The main body 40 includes a top 40A, a bottom 40B, a right side 40C and a left side 40D. Three separate grippers are coupled to the main body 40; a case gripper 45, a flattened articles gripper 47, and a dunnage gripper 49. A vacuum source 51, which may be a Venturi-type vacuum generator, is mounted on the top 40A of the main body 40.

Figure 5:
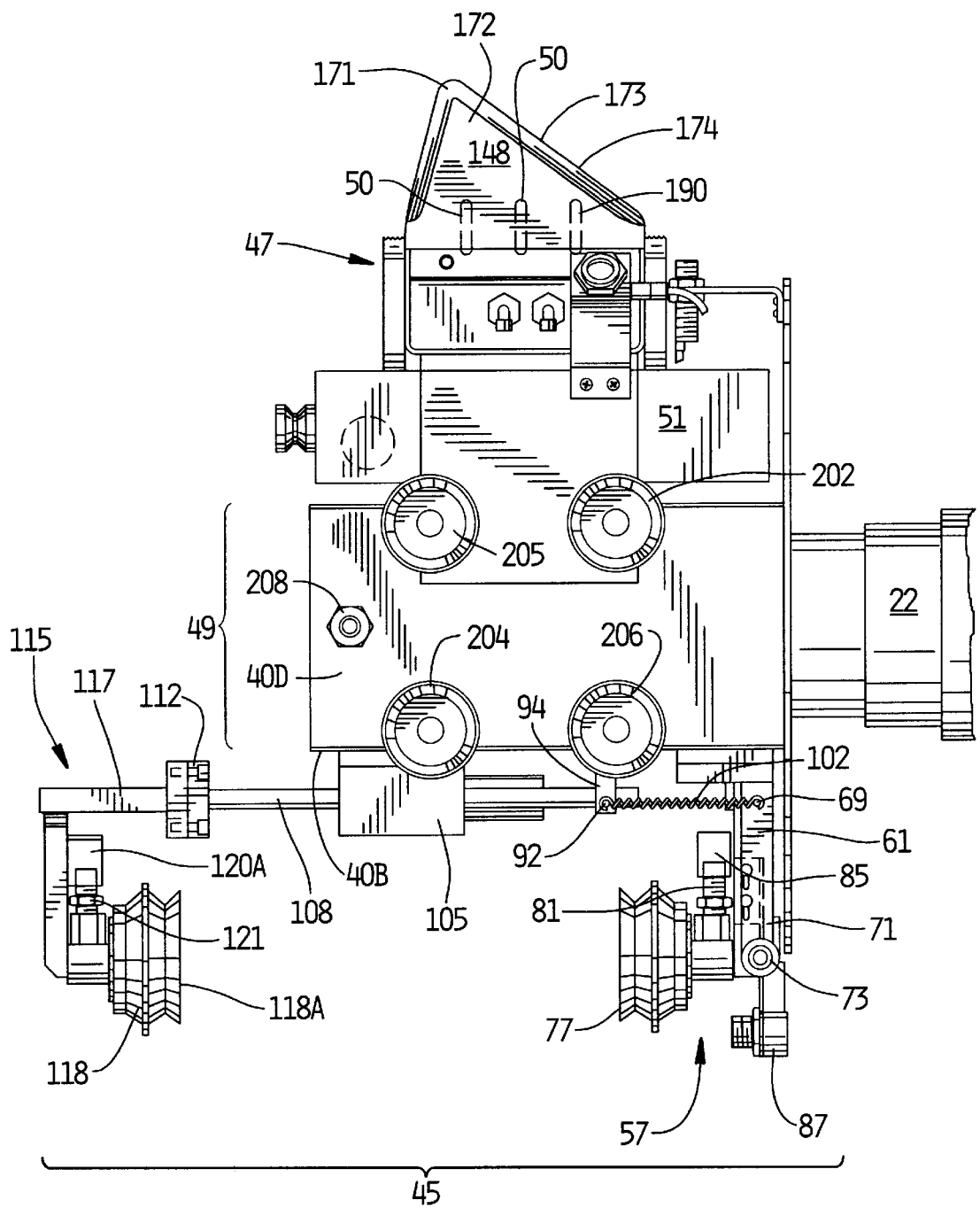
FIG. 5 is a perspective, left side view of the end effector of the present invention.
Figure 6:
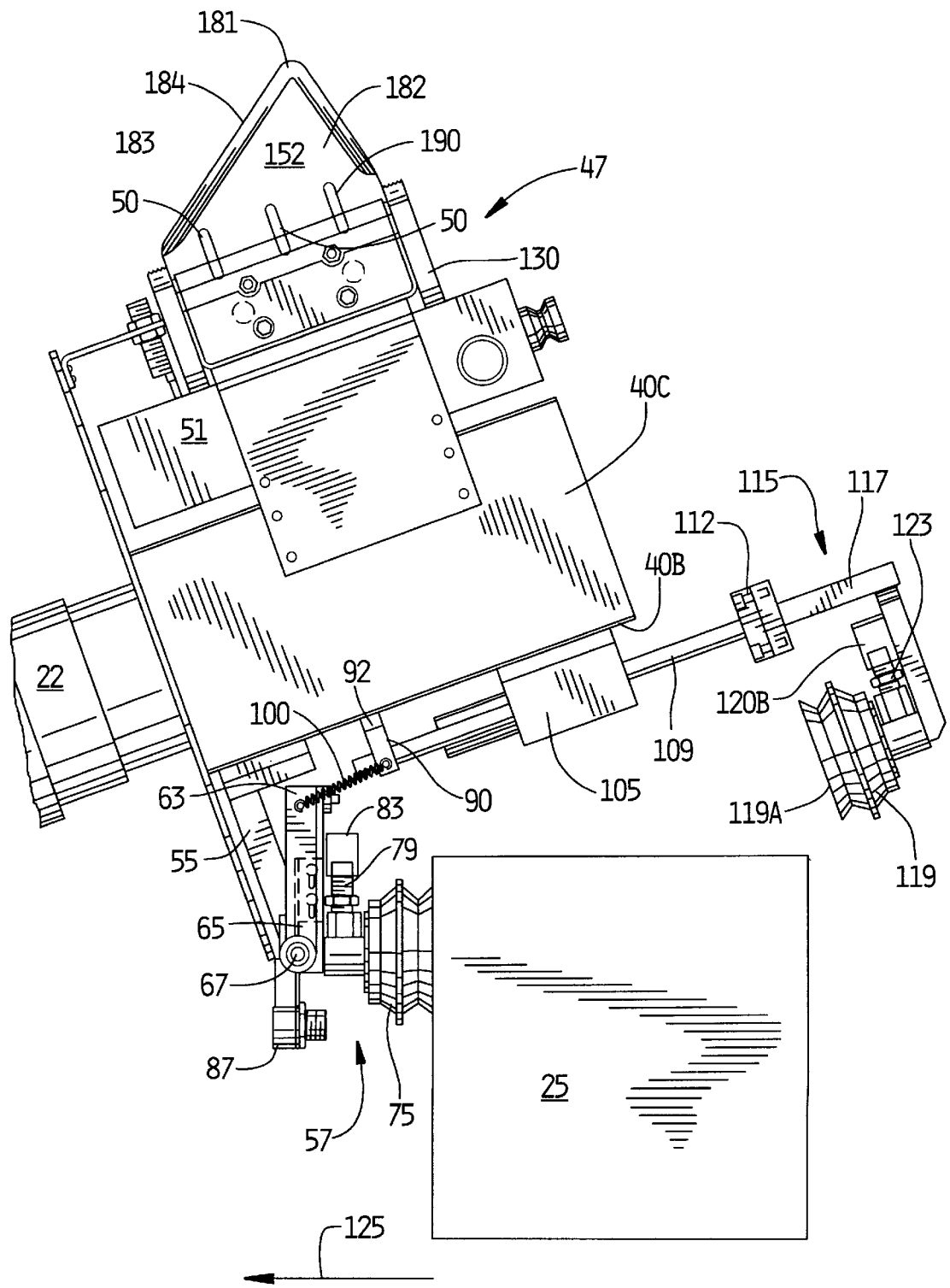
FIG. 6 is a perspective, right side view of the end effector of the present invention showing the case gripper of the end effector initially grasping a case of packaging material.

As best seen by reference to FIGS. 5–8, the case gripper 45 is mounted on the bottom 40B of the main body and includes a mounting plate or mount 55 (FIG. 6). A first suction assembly 57 is pivotably coupled to the mount 55. The first suction assembly includes two pivotable arms 59 and 61. The arm 59 includes a first end 63, a second end 65, and is coupled to the mount 55 with a pivot mechanism 67. Similarly, the arm 61 (FIG. 5) includes a first end 69, a second end 71, and is coupled to the mount with a pivot mechanism 73. A first suction cup 75 is mounted on the second end 65 of the arm 59 and a second suction cup 77 is mounted on the second end 71 of the arm 61. The first suction cup 75 has a coupler 79 and the second suction cup 77 has a coupler 81. The couplers 79 and 81 are connected to vacuum generators 83 and 85. The vacuum generators 83 and 85 are supplied with pneumatic pressure through pneumatic lines (not shown). Located adjacent to the first suction cup 75 and coupled to the arm 59 is a proximity sensor 87 that is coupled in data transmission relation to a microprocessing unit (not shown) in or coupled to the industrial robot 23. The proximity sensor 87 detects the presence of a case 25 and its location relative to the first suction assembly 57.

A second mount 90 is coupled to the main body 40 and spaced from the mount 55. The second mount 90 has a first end 92 and a second end 94. A first biasing mechanism 100 (such as a spring) is coupled to the first end 92 of the second mount 90 and the first end 63 of the first arm 59. Similarly, a second biasing mechanism 102 (such as a spring) is coupled to the second end 94 of the second mount 90 and the first end 69 of the second arm 61. The biasing mechanisms 100 and 102 exert a pulling force on the arms 59 and 61 so that when the end effector 22 is tilted from horizontal, the arms move to and maintain a substantially perpendicular or vertical position.

Figure 4:
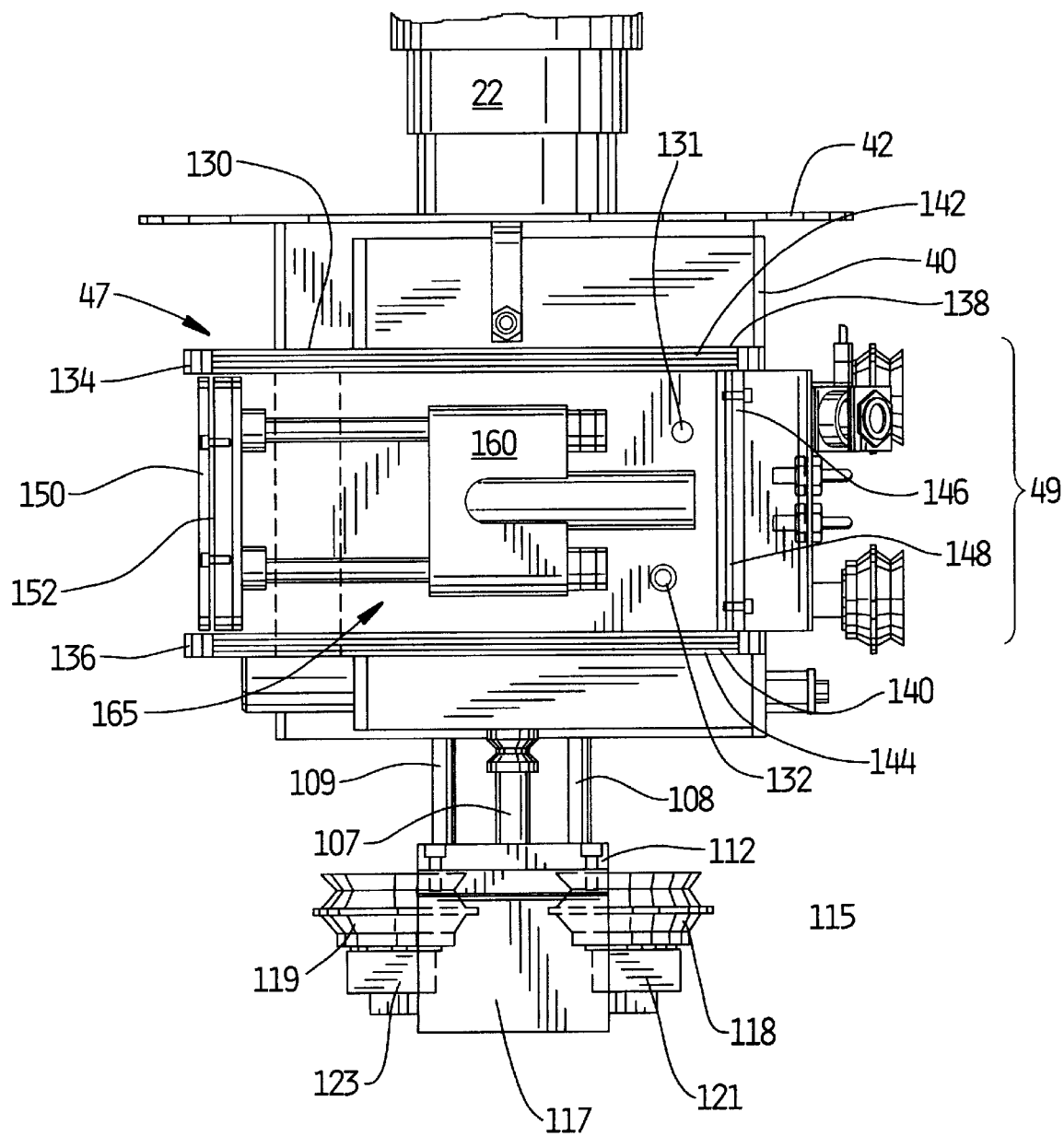
FIG. 4 is a perspective, bottom view of the end effector of the present invention.

The case gripper 45 also includes a linear thruster or slide 105 coupled to the main body 40. The linear slide is of conventional design (linear slides suitable for use in the present invention may be obtained from Bimba Manufacturing Company Monee, Ill., under the trade designation Bimba linear thrusters) and has a pneumatically-driven piston shaft or rod 107, and two support rods 108 and 109 (FIG. 4). The rods 107, 108, and 109 are moveable between a first, retracted position and a second, extended position. Mounted on the ends of the two support rods 108 and 109 and the piston rod 109 is a flange 112. A second suction assembly 115 is coupled to the flange 112.

The second suction assembly 115 includes an extension or mounting plate 117 and first and second suction cups 118 and 119 mounted thereon having faces 118A and 119A. The suction cups 118 and 119 are connected to vacuum generators 120A and 120B through two couplers 121 and 123 (FIGS. 5 and 6). The vacuum generators 120A and 120B are supplied with pneumatic pressure through pneumatic lines (not shown). The suction cups 118 and 119 are positioned so that the faces 118A and 119A are perpendicular to the longitudinal axis of the rod 107.

Figure 7:
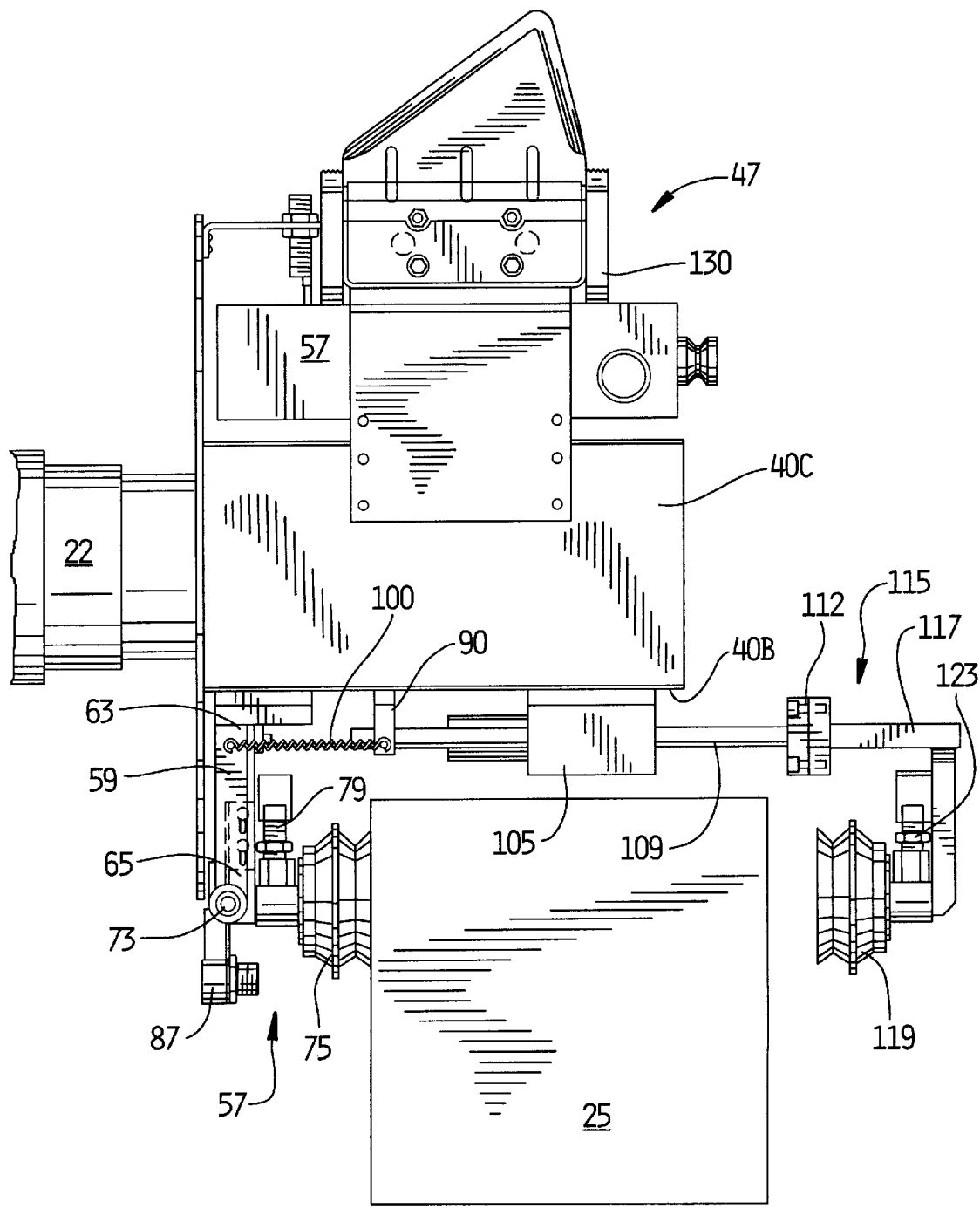
FIG. 7 is another perspective, right side view of the end effector of the present invention showing the case gripper of the end effector moved to a horizontal position to enable it to fully grasp a case of packaging material.
Figure 8:
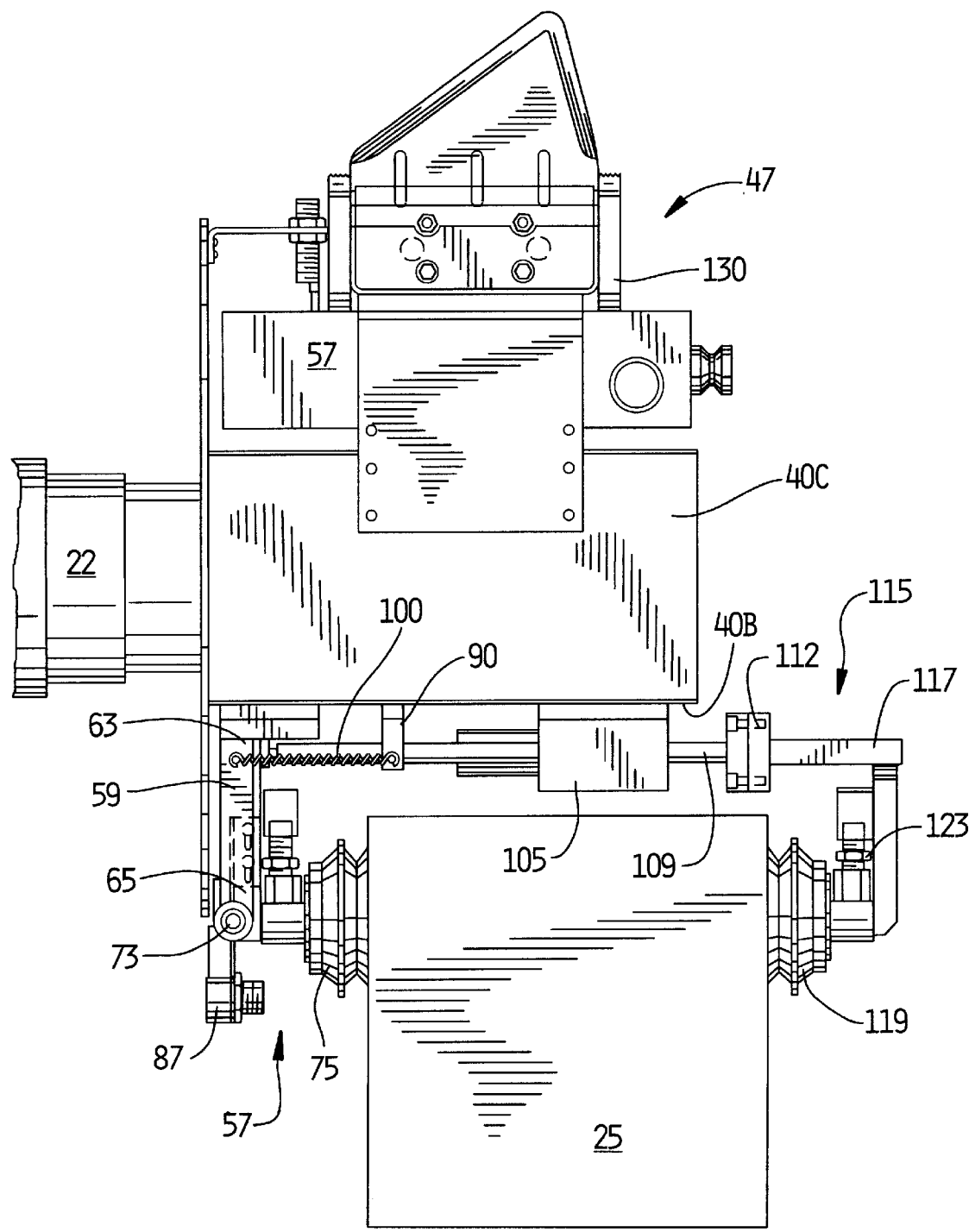
FIG. 8 is another perspective, right side view of the end effector of the present invention showing the case gripper of the end effector fully grasping a case of packaging material.

As best seen by reference to FIGS. 6, 7, and 8, the case gripper 45 is designed to pick a case 25 from a stack of such cases, for example, the stack 30. In order to select a single case, the robot arm is maneuvered so that the end effector 20 is positioned adjacent the stack 30 and tilted from horizontal so that the first suction assembly 57 is exposed to the selected case 25. As the end effector 20 is titled, the first suction assembly maintains its perpendicular or substantially vertical orientation and the suction cups 75 and 77 are moved into contact with the selected case 25 using feedback signals from the proximity sensor 87 (FIG. 6). Once the suction cups contact the case 25, vacuum is applied through them to grip the case 25. The end effector 20 is then moved rearwardly in the direction of arrow 125, pulling the case 25 along with it in the same direction.

The selected case 25 is pulled away from other cases 25 in the stack so that the second suction assembly 115 may be moved into place to grip the opposite side of the case 25. Specifically, after the selected case 25 is pulled out, the end effector 20 is rotated to a horizontal position (FIG. 7). Once rotated to horizontal, the second suction assembly 115 is pulled into contact with the case 25 (FIG. 8). When pulled into contact, the ends of the rods 108 and 109 are driven backward to contact the first ends 63 and 69 of the arms 59 and 61 of the first suction assembly 57, thereby preventing the first suction assembly 57 from tilting. Vacuum suction is then applied to the suction cups 118 and 119. Gripped by the two suction assemblies 57 and 115, the selected case 25 can be lifted upward by the arm 22 and moved to the unloading station 32.

At the unloading station 32, the case gripper 45 releases the selected case 25 and the robot arm 22 rotates the end effector 20 so that the flattened articles gripper 47 may be inserted into the selected case 25 to remove the packaging material within it. One embodiment of the flattened articles gripper 47 is described in application Ser. No. 08/571,215 (now U.S. Pat. No. 5,727,832), the disclosure of which is incorporated by reference herein. The flattened articles gripper 47 is mounted on the vacuum source 51 and includes a vacuum chamber or housing 130 (FIG. 4) designed to be coupled to the vacuum source 51 through a port 131 and has a vacuum sensor 132 to measure the strength of the vacuum in the housing. The vacuum sensor 132 is coupled in data transmission relation to a microprocessing unit in or coupled to the industrial robot 23.

The housing 130 has two side walls 134 and 136. The side walls 134 and 136 are positioned so as to be substantially parallel to each other and each of walls has a strip of sealing material 138 and 140, respectively, mounted on it. The strips 138 and 140 each have a ridged surface 142 and 144. The sealing material may be any one of numerous rubber seals known in the art. A suitable rubber seal may be obtained from Trim-Lok, Inc., Buena Park, Calif., under the trademark TRIM-LOK, product number X-103.

The housing 130 also includes two other side walls. A third wall 146 is fixed on the left hand side (FIG. 4) of the housing and has a blade 148 mounted on it. A fourth adjustable wall 150 is positioned on the right hand side of the housing 130. The fourth adjustable wall has a blade 152 mounted on it and is coupled to a linear thruster 160. The adjustable wall 150 is adjusted so as to fit the size of the stack of packaging material or flattened articles handled by the end effector 20. Specifically, the linear thruster 160 permits adjustment of the dimensions of the housing 130 to better match the dimensions of a stack of flattened containers.

The four walls 134, 136, 146, and 150 define a vacuum face or opening 165. Vacuum suction is distributed across the opening 165 when vacuum is applied to the housing 130. As should be apparent, the strength of the vacuum suction is affected by the seal between the opening 165 and the articles to be picked up. The blades 148 and 152 are designed with specific features to ensure that a good seal exists. The blade 148 has a point 171 (FIG. 5) pointing outward from the housing 130, a substantially smooth surface 172, a grooved surface 173, and an end edge 174. Similarly, the blade 152 has a point 181 (FIG. 6) pointing outward from the housing 130, a substantially smooth surface 182, a grooved surface 183, and an end edge 184. Each blade has a thickness of about 1/8" and is made from a plastic material such as nylon. A nylon suitable for use in the present invention is available under the trade designation Nylon 101 from one of many plastic distributors including Central Plastics Distributors in Madison, Wis. The blades 148 and 152 are positioned in axial opposition to one another so that their respective grooved surfaces 173 and 183 face each other. As shown, the blades 148 and 152 are shaped like acute triangles. However, the blades may be square, circular, or other shapes. In addition the size of the blades may be varied.

The grooved surfaces 173 and 183 include a plurality of grooves 190, arranged in a predetermined pattern. The grooves provide a channel through which vacuum may travel down along the side of the stack of articles to be handled, thereby improving the grip of the flattened articles gripper 47, and may be approximately 1/4" wide and 1/16" deep. While the highest level of performance appears to be achieved in a device having grooved blades, the gripper 47 still functions if the surfaces 173 and 183 are substantially smooth.

As the blades of the flattened articles gripper 47 are maneuvered into the desired position, a suction force or vacuum pressure is created by a vacuum applied to the housing 130 through the port 132. Once the strips 142 and 144 contact the packaging material in the selected case 25, a vacuum seal is created along the opening 165. In order to pick up a load of about 40 pounds, the vacuum pressure in the housing 130 should be maintained at a level of about 5 to about 10 inches of mercury. The vacuum pressure may be monitored by the vacuum sensor 132.

The gripping or holding force created by the vacuum seal along the opening 165 holds the packaging material 27 against the ridged surfaces 142 and 144 of the sealing strips 138 and 140. So gripped, the packaging material 27 may be lifted and removed from the case 25.

The third and last gripper mounted on the main body 40 is the dunnage gripper 49. As best seen in FIG. 5, the dunnage gripper 49 includes first, second, third, and fourth suction cups 200, 202, 204, and 206 mounted on the left side 40D of the main body 40. Like the suction cups in the case gripper 45, the suction cups in the dunnage gripper 49 are each coupled to separate vacuum generators of conventional design. For the sake of brevity, the vacuum generators are not discussed in detail. The dunnage gripper 49 also includes a proximity sensor 208. The dunnage gripper 49 is used to pick up and remove dunnage sheets 210 (FIGS. 9, 9A, and 9B) from the top of and in between the layers of the stack 30 of cases 25 to a discarding or piling location (FIG. 9B) where the dunnage sheets may be stacked and removed by workers for proper disposal or recycling. The sensor 208 senses the distance between the end effector 20 and a dunnage sheet 210 and its signal is used by the microprocessing unit to control motion of the arm 22 to pick up and handle each sheet. As can be seen by reference to FIGS. 14B, 14C, and 14D, the dunnage gripper 49 is also used to remove empty cases from the unloading station 32.

While the end effector 20 may be used in a variety of applications where there is a need to grasp a case from a tightly packed stack of cases, the end effector is particularly useful when used in conjunction with the unloading station 32. The unloading station 32 (FIG. 1) consists of a drop-off table 250 having two rails 252 and a side suction assembly 254. Adjacent to the drop-off table 250 is a bursting table 256 having an L-shaped base 258 pivotably coupled to a floor mount 260 and movable between a horizontal position $P_h$ (shown in phantom lines in FIG. 11C) and a vertical position $P_v$ (shown in solid lines in FIG. 11C). Mounted on top of the L-shaped base 258 is a table top 264 having a first side 266 and a second side 268. A center suction assembly 270 is positioned between the two sides 266 and 268. Adjacent to the bursting table 256 is a powered ram 275 mounted on a stand 276. The ram 275 has a head 278 with four vanes 280. As will be described below, the vanes 280 are designed to burst open the bottom of a selected case 25.

Another useful component of a system for unloading packaging materials is a regripping station 300 (FIG. 1). The regripping station 300 includes a table 302 with a first plate 304 and a second plate 306. When used in conjunction with the unloading station 32 and the regripping station 300, the robot 23 equipped with the end effector 20 can be used to efficiently remove cases from the stack 30, empty the cases, and dispose of empty cases and dunnage sheets. FIGS. 9 through 14D show the specific steps of the unloading operation, in time sequence.

As discussed above, any dunnage sheet 210 on top of the stack 30 is initially removed from the top of the stack 30 (FIGS. 9–9B). Subsequent dunnage sheets 210 are removed from the stack 30 as they are exposed, as each layer of cases 25 is removed from the stack 30. With the top dunnage sheet 210 removed, a selected case 25 (FIG. 10) may be grasped by the end effector 20. The selected case 25 is pulled out of the stack 30 so as to expose two more of its sides and enable the case gripper 45 to grasp the selected case on opposite sides of it, in a pinching motion (FIGS. 10A–10C). The selected case 25 is then moved to the drop-off table 250 (FIGS. 10C–10E).

As seen in FIGS. 11–11D, the selected case 25 is placed on the drop-off table 250 and then grasped on one side by the side suction assembly 254 and the center suction assembly 270 of the bursting table 256. The end effector 20 is rotated on the robot arm 22 so that the flattened articles gripper 47 is facing downwardly and its blades 148 and 152 may be inserted into the selected case 25, the sides of which are being pulled apart by the suction assemblies 254 and 270.

As shown in FIGS. 11E through 12B, the flattened articles gripper 47 grasps the packaging material 27 in the selected case 25 as the adjustable blade 152 moves toward the blade 148 and a vacuum is applied to the gripper. The robot arm 22 is then lifted upward, lifting the gripped packaging material upward. Subsequently, the robot arm 22 is moved toward the regripping station 300. After the selected case 25 has been emptied, the bursting table 256 moves to the horizontal position $P_h$, taking the case 25 with it.

After removing the packaging material 27 from the selected case 25, the packaging material 27 is moved to the regripping station 300, where it is temporarily placed while the robot 23 moves the end effector 20 so that the flattened articles gripper 47 may grasp the packaging material 27 on the side opposite the side originally gripped (FIGS. 12C–13). It should be understood that the regrip operation is not a required step, but is needed when the packaging material 27 must be placed in a specific orientation to accommodate special features of it such as handle holes 310. Once the packaging material 27 is regripped it may be placed in the feeding mechanism 34 (FIGS. 1 and 13A).

Having placed the packaging material 27 in the feeding mechanism 34, the end effector 20 is ready to pick another case 25 from the stack 30. However, the originally selected, empty case remains on the bursting table 256. Thus, the ram 275 is used to burst the bottom of the case 25, and the dunnage gripper 49 is used to flatten and then remove the burst case 25 from the unloading station 32. Thereafter, the next case 25 may be selected and the cycle of emptying cases continues.

Thus, the present invention provides a useful end effector and system for removing packaging material from cases. Furthermore, while the present invention has been described in what is believed to be the most preferred form, it is to be understood that the invention is not confined to the particular construction and arrangement of the components herein illustrated and described, but embraces such modified forms thereof as come within the scope of the appended claims.

What is claimed is:

1. An end effector for use with a robot, the end effector comprising:
    a main body capable of being coupled to the robot, the main body having a first side, a second side, and a third side;
    a case gripper mounted on the second side of the main body, the case gripper including a mount, a first suction assembly pivotably coupled to the mount, a linear slide, and a second suction assembly coupled to the linear slide;
    a vacuum generator mounted on the main body;
    a flattened articles gripper mounted to the first side of the main body and coupled in fluid communication to the vacuum generator; and
    a dunnage gripper mounted on the third side of the main body.

2. An end effector as in claim 1, wherein the first suction assembly of the case gripper includes an arm pivotably coupled to the mount and the arm is biased to remain in a substantially vertical position, the arm having first and second ends, a suction device mounted on it, near the second end, and a sensor on the second end.

3. An end effector as in claim 1, wherein the linear slide includes a shaft moveable between a first, retracted position and a second, extended position, and a flange; and the second suction assembly of the case gripper is coupled to the flange and includes a suction device with a face that is perpendicular to the longitudinal axis of the shaft of the linear slide.

4. An end effector as in claim 1, wherein the case gripper and the dunnage gripper each include at least one vacuum generator.

5. An end effector as in claim 4, wherein the vacuum generator is a Venturi-type vacuum generator.

6. An end effector as in claim 1, wherein the flattened articles gripper includes
    a vacuum chamber with a port coupled to the vacuum generator and an opening positioned in spaced relation relative to the port and having a peripheral edge;
    a first blade positioned along a first portion of the peripheral edge of the opening; and
    a second blade positioned along a second portion of the peripheral edge of the opening, wherein the flattened articles gripper is capable of holding a plurality of stacked, substantially flattened articles when a vacuum is being applied through the port.

7. An end effector as in claim 6, wherein the first and second blades are shaped like an acute triangle.

8. An end effector as in claim 6, wherein the first blade has a grooved surface and the second blade has a grooved surface.

9. An end effector as in claim 6, and wherein the first and second blades are manufactured from plastic material.

10. A case gripper for use with a robot, the case gripper comprising:
    a mount capable of being coupled to the robot;
    a first gripper assembly pivotably coupled to the mount, the first gripper assembly having an arm biased in a substantially vertical position, having first and second ends, a gripping device mounted on the arm near the second end, and a sensor on the second end;
    a linear slide fixed to the mount, the linear slide having a shaft moveable between a first, retracted position and a second, extended position; and
    a second gripper assembly coupled to the shaft of the linear slide, the second gripper assembly including a gripping device with a face that is perpendicular to the longitudinal axis of the shaft of the linear slide.

11. A case gripper as in claim 10, wherein the first gripper assembly includes a second arm pivotably coupled to the mount, the second arm biased in a substantially vertical position and having first and second ends, the second end of the second arm having a gripping device and a sensor mounted on it.

12. A case gripper as in claim 10, wherein an extension is coupled to the linear slide and the second gripping assembly of the case gripper is mounted on the extension.

13. A case gripper as in claim 10, wherein the case gripper is coupled in fluid communication to a vacuum generator.

14. A system for unstacking and unloading a stack of cases, each case filled with flattened articles, the system comprising:
    a robot with an end effector, the end effector having a case gripper, a flattened articles gripper, and a dunnage gripper; and
    an unloading station positioned adjacent to the robot and having a drop-off table, a bursting table, and a powered ram.

15. The system as in claim 14, wherein the case gripper includes:
    a mount capable of being attached to the robot;
    a first gripping assembly pivotably coupled to the mount, the first gripping assembly having an arm biased in a substantially vertical position, the arm having first and second ends, a gripping device mounted on the arm near the second end, and a sensor on the second end of the arm;
    a linear slide fixed to the mount, the linear slide having a shaft moveable between a first, retracted position and a second, extended position; and
    a second gripping assembly coupled to the shaft, the second gripping assembly including a gripping device with a contact surface that is perpendicular to the longitudinal axis of the shaft of the linear slide.

16. A system as in claim 15, wherein the first gripping assembly includes a second arm pivotably coupled to the mount, the second arm biased in a substantially vertical position and having first and second ends, the second end of the second arm having a gripping device and a sensor mounted on it.

17. A system as in claim 15, wherein an extension is coupled to the linear slide and the second gripping assembly of the case gripper is mounted on the extension.

18. A system as in claim 15, wherein the case gripper is coupled in fluid communication to a vacuum generator.

19. A system as in claim 14, further comprising a re-gripping station.

* * * * *